(12) United States Patent
Madour et al.

(10) Patent No.: US 7,561,579 B2
(45) Date of Patent: Jul. 14, 2009

(54) METHOD FOR CONTROLLING THE QUALITY OF SERVICE IN AN IP MULTIMEDIA SYSTEM

(75) Inventors: Lila Madour, Kirkland (CA); Nadia Bishai, Montreal (CA); Shabnam Sultana, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 619 days.

(21) Appl. No.: 11/108,805

(22) Filed: Apr. 19, 2005

(65) Prior Publication Data
US 2006/0251043 A1 Nov. 9, 2006

(30) Foreign Application Priority Data
Apr. 18, 2005 (CA) .................................. 2504499

(51) Int. Cl.
*H04L 12/28* (2006.01)
*H04L 12/56* (2006.01)
(52) U.S. Cl. ................................................ 370/395.21
(58) Field of Classification Search ................. 370/231, 370/235, 252, 333, 351, 395.2, 395.21, 395.52, 370/328, 329, 335, 342; 455/435
See application file for complete search history.

(56) References Cited
U.S. PATENT DOCUMENTS
6,993,595 B1 * 1/2006 Luptowski et al. .......... 709/245

2005/0165917 A1 * 7/2005 Le et al. ...................... 709/220
2006/0072526 A1 * 4/2006 Rasanen ...................... 370/338
2006/0176907 A1 * 8/2006 Takeda ........................ 370/468
2007/0070958 A1 * 3/2007 Rinne et al. .................. 370/338

OTHER PUBLICATIONS

Stefano M. Faccin, Poornima Lalwaney, and Basavaraj Patil, IP Multimedia Services: Analysis of Mobile IP and SIP Interactions in 3G Networks, Jan. 20004, IEEE, pp. 116-117.*
3rd Generation Partnership Project 2, 3GPP2, All-IP Core Network Multimedia Domain, Overview, 3GPP2 X.S0013-000-0, Version 1.0, Dec. 2003.

* cited by examiner

Primary Examiner—Chirag G Shah
Assistant Examiner—Ashley L Shivers
(74) Attorney, Agent, or Firm—Alex Nicolaescu; Ericsson, Canada, Inc.

(57) ABSTRACT

The invention relates a method for providing a level of service for a Mobile Terminal (MT) in a packet data telecommunications network. The further method receives at the MT from a proxy server a request message for requesting the quality of service for a session between the MT and the proxy server. The method generates, based on a proxy server IP address received during a registration of the MT at the proxy server, a token for correlating accounting information and inform the proxy server of the quality of service to be applied to packet data sent on to be sent during the session, wherein the token includes the proxy server IP address and a session identity parameter and responsive to the reception of the request from the IMS proxy server, sending a response message including the token to the proxy server.

5 Claims, 2 Drawing Sheets

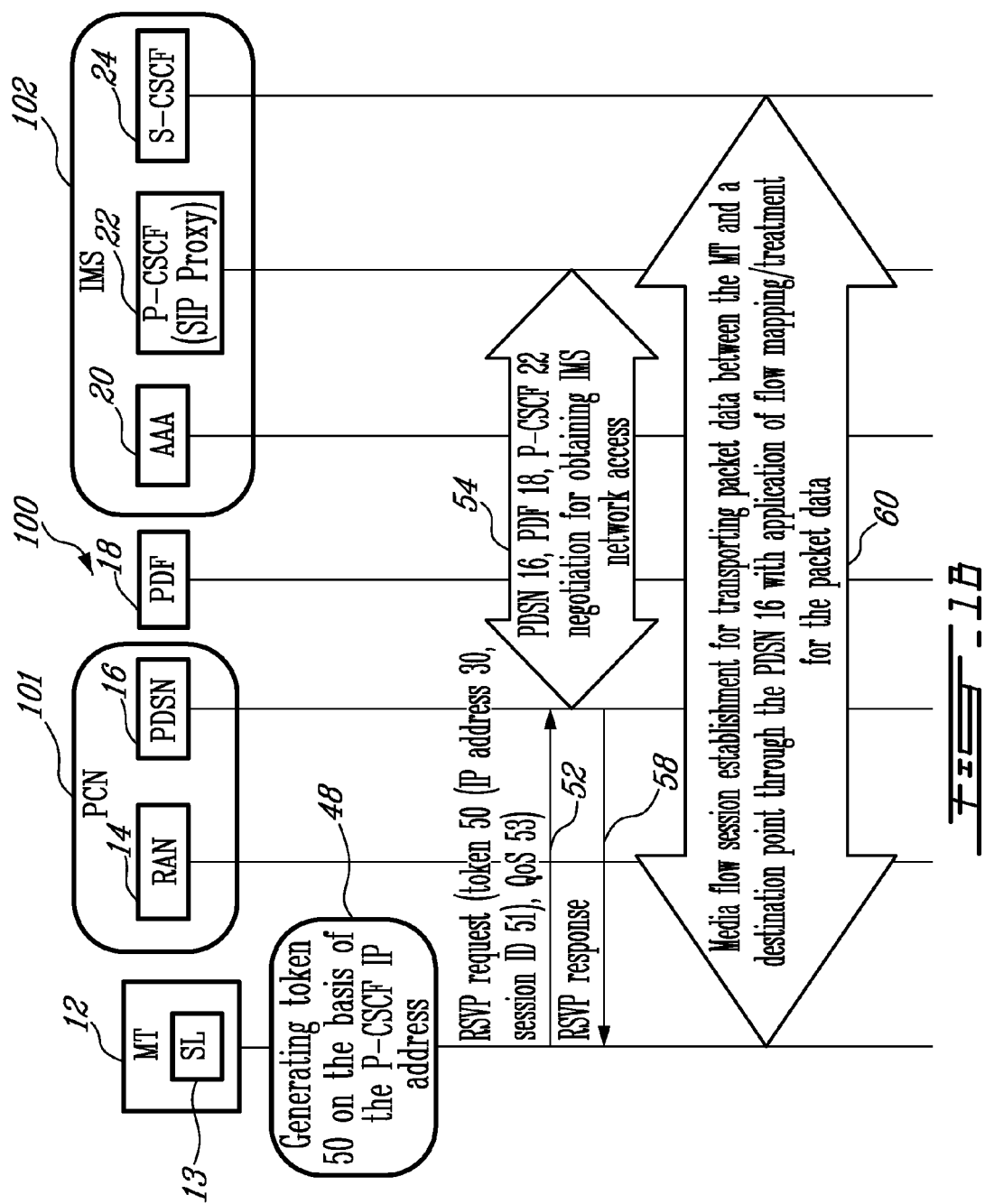

METHOD FOR CONTROLLING THE QUALITY OF SERVICE IN AN IP MULTIMEDIA SYSTEM

BACKGROUND OF THE INVENTION

1. Field of the Invention

The invention relates to a method for providing quality of service to a user of a Mobile Terminal (MT) in a packet data network.

2. Description of the Related Art

The prior art provides an end-to-end bearer resources management for a negotiated QoS within a packet data network. Third Generation Partnership Project 2 (3GPP2) specifications, as described in the All-IP Core Network Multimedia Domain (3GPP2 specifications), X.S0013-000-0 v1.0 published in December 2003 by 3GPP2, provide a segmented end-to-end model. This model exploits the information available from an application signaling protocols such as in Session Initiation Protocol (SIP) to request the bearer resources on both a "local" network such as a Packet Core Network (PCN) and a "remote" network such as an Internet Protocol (IP) Multimedia Subsystem (IMS) of an end-to-end bearer channel of a packet data network. Each end-to-end bearer channel is managed as three distinct segments: the access network for the originating side of the session such as the PCN (local segment), a backbone network, and the access network such as the IMS (remote segment) for the terminating side of the session. The segmented model allows for each segment where resources are allocated to either maintain per-flow reservations and carefully manage resource usage or employ other bearer resource management methods for Mobile Terminals (MTs).

3GPP2 addresses the authorization of bearer resource associated with the local segment and the remote segment, and assumes that in these segments that the resources are managed on a per flow basis.

In the segmented end-to-end model, bearer resources are reserved before a MT is notified that another MT is attempting to initiate a communication. After a first phase of the application signaling, both MTs have completed capability negotiations and know the bearer resource requirements for an end-to-end bearer channel. Subsequently, the MTs request the bearer resources on their respective segments (local or remote). The access network using a Packet Data Service Node grants bearer resources, forwards a bearer resource request to the backbone segment. If there are insufficient bearer resources available for a session, the session is terminated.

As regards to 3GPP2 specification, one solution may be to generate a token at a P-CSCF in the remote network (IMS network). The token consists of a Proxy Call Session Control Function (P-CSCF) IP address and a session identity, which will be sent to a Mobile Terminal (MT) from the P-CSCF. The P-CSCF is the initial interface (SIP Server) between the MT and the IMS. The MT would provide that information to the PDSN in the PCN, which subsequently provides it to a Packet Data Function (PDF) located between the local segment and the access segment. The PDF uses the token information to communicate with the P-CSCF to request the session information and correlates the information between the local network and the remote network. However, a problem is the impact on the IMS to generate the token. Although it seems reasonable to require a P-CSCF to generate a token, that may not be a reasonable requirement for non-SIP network entity such as an Real Time Streaming Protocol (RTSP) server. RTSP is defined in RFC 2326, published in April 1998 by the Engineering Task Force. The RTSP is a client-server multimedia presentation control protocol, designed to address the needs for efficient delivery of streamed multimedia over IP networks.

A solution could be to generate the token at the PDF, but that requires the P-CSCF to discover the PDF and this may cause a high consumption of resources in the remote network. For that reason, there is a need to save resources on the remote network while providing a level of services to MTs that use a local and a remote network for communicating with another MT or for receiving packet data services from the remote network. The invention provides a solution to this problem.

SUMMARY OF THE INVENTION

It is a broad object of the present invention to provide a method for providing a level of service for a Mobile Terminal (MT) in a packet data telecommunications network, the method comprising the step of:

receiving at the MT from a proxy server a request message for requesting the quality of service for a session between the MT and the proxy server;

generating, based on a proxy server IP address received during a registration of the MT at the proxy server, a token for correlating accounting information and informing the proxy server of the quality of service to be applied to packet data to be sent during the session, wherein the token includes the proxy server IP address and a session identity parameter; and responsive to the reception of the request from the IMS proxy server, sending a response message including the token to the proxy server.

It is another broad object of the present invention to a MT for receiving packet data services in a packet data network, the MT comprising:

a Service Logic (SL) adapted for:

receiving from a proxy server a request message for requesting the quality of service for a session between the MT and a proxy server;

generating, based on a proxy server IP address received during a registration of the MT at the proxy server, a token for correlating accounting information and informing the proxy server of the quality of service to be applied to packet data to be sent during the session, wherein the token includes the proxy server IP address and a session identity parameter; and responsive to the reception of the request from the IMS proxy server, sending a response message including the token to the proxy server.

responsive to the reception of the request from the IMS proxy server, sending a response message including the token to the proxy server.

BRIEF DESCRIPTION OF THE DRAWINGS

For a more detailed understanding of the invention, for further objects and advantages thereof, reference can now be made to the following description, taken in conjunction with the accompanying drawings, in which:

FIGS. 1A and 1B are illustrating a signal flow diagram of messages for providing level of service for a Mobile Terminal (MT) in a packet data telecommunication network.

DETAILED DESCRIPTION OF THE PREFERRED EMBODIMENTS

Figure 1A:
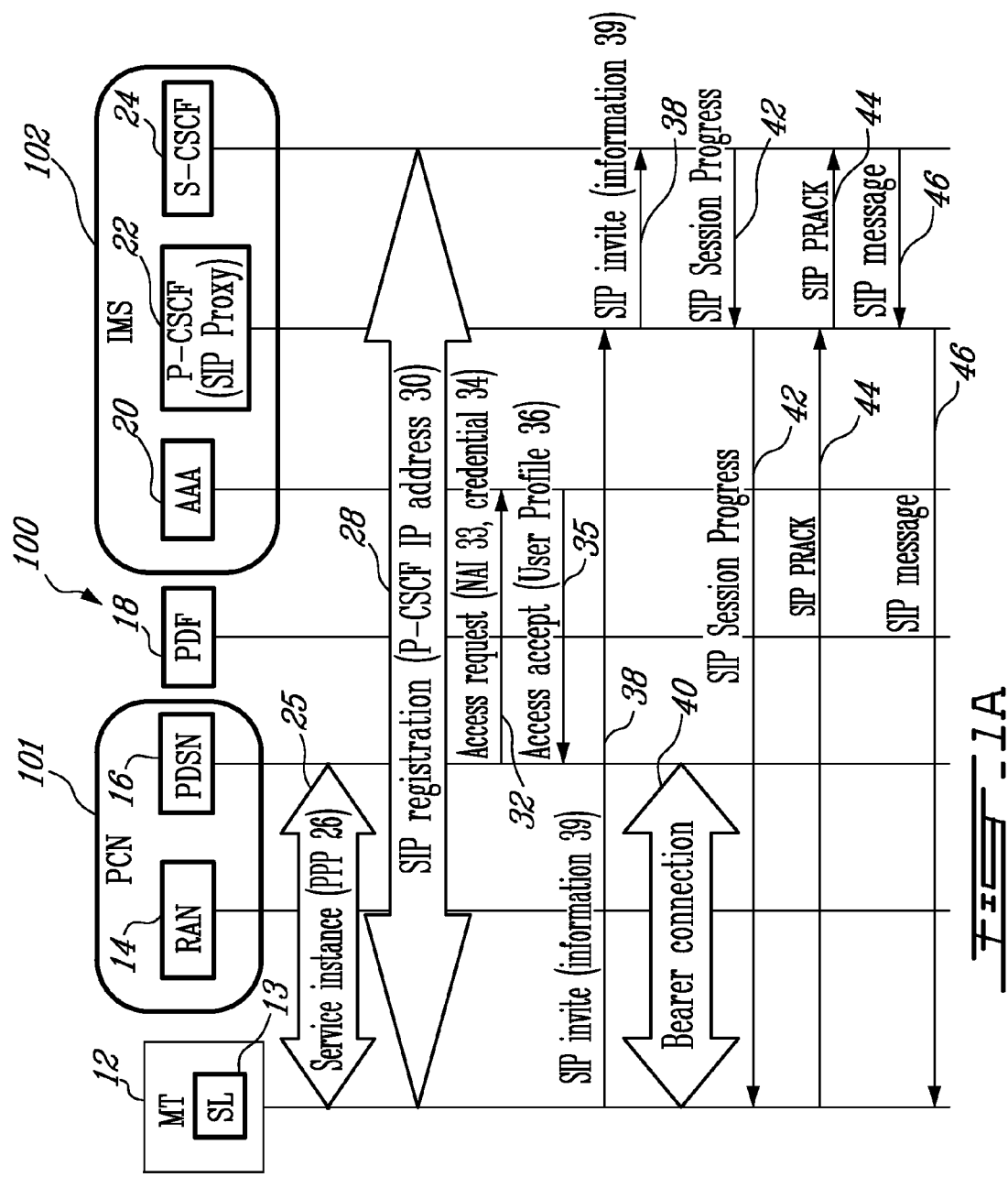

Reference is now made to FIGS. 1A and 1B, which are a signal flow diagram of messages for providing packet data services and a level of services to a Mobile Terminal (MT) 12 in a packet data telecommunications network 100. The MT 12 can be any mobile equipment that is adapted to receive packet data services such as voice over IP (VoIP) or multimedia services to the MT 12. The present invention is not limited to the providing of these two services, and it should be clear that any service that can be provided by the present network 100 is also encompassed. The MT 12 comprises a Service Logic (SL) 13 which is adapted to receive, process and send messages in the packet data telecommunications network 100, the SL 13 also operates the MT 12 and generates tokens for the MT 12. The SL 13 can be a software or hardware or any combination thereof.

The packet data network 100 can be any third generation (3G) cellular telecommunications network that allows a subscriber of the MT 12 to communicate via a packet data network such as a Code Division Multiple Access (CDMA2000) network or a Global System Mobile/General Packet Radio Service (GSM/GPRS). The packet data network is not only limited to 3G networks and can also be adapted to wire-line networks. It can be therefore understood that the packet data network 100 in FIGS. 1A and 1B is given as an example and other network elements having similar functionalities in a CDMA2000 GSM/GPRS and wire-line networks may be also used for carry the solution provided by the invention.

The packet data network 100 comprises a Packet Core Network (PCN) 101 and an Internet Protocol (IP) Multimedia Subsystem (IMS) 102. The MT 12 is currently located in the PCN 101 and wishes to receive packet data services available in the IMS 102. The PCN 101 comprises a Radio Access Network (RAN) 14 that provides radio access to the MT 12 and is adapted to maintain a Point-to-Point Protocol (PPP) session between a Packet Data Service Node (PDSN) 16 and a MT 12. A PPP session consists of a data link protocol between the terminal and the PDSN 16. The PPP session defines a period during which a particular PPP connection instance is maintained in the open state in both the MT 12 and PDSN 16. The PDSN 16 is a connection point between the RAN 14 and IP networks such as the IMS 102. The PDSN is also responsible for supporting authentication mechanisms and a configuration option to allow the MT 12 to receive packet data services in the PCN.

The IMS 102 comprises a Proxy Call Session Control Function (P-CSCF) 22 that acts as a Session Initiation Protocol (SIP) proxy server for the IMS 102 and the MT 12. The P-CSCF 22 is the entry point of the IMS 102. The MT 12 discovers the address of the P-CSCF 22 during a registration procedure. The IP address of the P-CSCF 22 may also be provided during the Packet Data Protocol (PDP) Context Activation process. Alternatively, the IP address of the P-CSCF 22 may be resolved after the PDP Context Activation process through the DHCP (Dynamic Host Configuration Protocol) Query/Response process. In this case the MT 12 will request an IP address along with other parameters in order to establish a session with the IMS 102.

The IMS 102 further comprises a Serving Call Session Control Function (S-CSCF) server 24 connected to the P-CSCF 22. The S-CSCF 24 provides session control services for the MT 12. The S-CSCF 24 also manages mobile registrations, maintains IMS sessions, and provides charging and security applications for the MT 12. The IMS further comprises an Authorization, Authentication and Accounting (AAA) server 20. The AAA server 20 authenticates and authorizes the MT 12, provides user profile and Quality of Service (QoS) information to the PDSN 16, and stores accounting data regarding registered MTs in its network. The packet data network 100 also comprises a Packet Data Function (PDF) 18 located between the PCN 101 and the IMS 102.

The PDF 18 interacts with the PDSN 16 in the PCN 101 for the purposes of defining flow based charging rules to be applied by the PDSN 16. The PDF 18 further interacts with the P-CSCF 22 in the IMS 102 for correlating session control information for the MT 12.

At step 25, the MT 12 establishes a main service instance 25, which results in establishing a PPP session 26 between the MT 12 and the PDSN 16. The main service instance 25 provides a communication channel that allows the MT 12 to send and receive control messages and user data from other network entities within the network 100 such as the PDSN 16. The RAN 14 maintains the PPP session 26 between the PDSN 16 and the MT 12.

The MT 12 has to be registered on the IMS before receiving packet data services from the IMS 102. In order, to provide such access to the MT 12, a registration 30 of the MT 12 with the IMS 102 is performed for establishing a media flow session (step 28). During the SIP registration, information concerning the IMS 102 is provided to the MT 12. Among the number of parameters provided to the MT 12, the P-CSCF IP address 30 is sent to the MT 12.

Following this, the PDSN 16 sends an Access-Request message 32 to the AAA server 20. The message 32 contains a Network Access Identifier (NAI) 33 and credential 34 for authenticating the MT 12 at the AAA server 20 and therefore authenticating the MT 12. The credential 34 is an authenticator generated by the MT 12 in response to a request (not shown) received by the PCN 101 during the PPP session 26. The AAA server 20 successfully authenticates the MT 12 and sends an Access-Accept message 35 that contains a user subscription profile 36 of the MT 12.

In order to receive packet data services from the IMS 102 or to make a call to another MT through the IMS 102, the MT 12 sends a SIP Invite 38 to the IMS 102. For doing so, the MT 12 uses the P-CSCF IP address 30 received during the registration 28 and sends the SIP invite request 38 to the P-CSCF 22. The P-CSCF 22 in turn forwards the SIP Invite request 38 to the S-CSCF 24. The SIP session invite 38 includes information 39 for setting up a session between the MT 12 and the IMS 102. The S-CSCF 24, responds to the MT 12 with a SIP Session Progress message 42. The message 42 is first sent to the P-CSCF 22 prior to be ultimately sent to the MT 12.

At step 40, a Bearer resource connection 40 is then established between the MT 12 and the PDSN 16 as described in the All-IP Core Network Multimedia Domain (3GPP2 specifications), X.S0013-000-0 version 1.0 published in December 2003 by 3GPP2. The Bearer connection 40 includes messages (not shown) sent between the MT 12, the RAN 14 and the PDSN 16. The MT 12 first sends a message to the RAN 14 for establishing an auxiliary service instance. Then the RAN 14 sends a Service Connect message for providing a requested packet data services to the MT 12. Next, the RAN 14 sets up A8 and A10 connections with the MT 12. The PDSN sends an A11 RRP to the RAN. This message sets up the Bearer resource connection establishment 40. Alternatively, the Bearer connection 40 may also be established following the sending of message 38.

The MT 12 decides on the set of media streams for the session and confirms receipt of the initial offer response by sending a SIP Progress acknowledgement message (Prack). The Prack message 44 is forwarded by the P-CSCF to the S-CSCF 24. The S-CSCF responds to the Prack message 44 with a SIP massage 46 for confirming the reception of the SIP Prack request message 44 and for requesting a set of media streams and level of the quality of services that will be applied for packet data sent and received during the session.

In a way to receive the requested packet data services, the MT 12 generates a token 50. The token 50 identifies the level of services, which results on identifying a set of media streams to be sent to the PDSN 16 in order for a media flow session to be established between the MT 12 and the IMS 102. The MT 12 uses the IP address 30 of the P-CSCF 22 and generates a token 50 for correlating information between the PCN 101 and the IMS 102. The token 50 includes the P-CSCF IP address 30 and a session identifier 51. Generating the token at the MT 12 allows saving network resources in the IMS 102 and at the PDF 18. Next, the MT 12 sends an RSVP request message 52 including the generated token 50 and other parameters and QoS parameters 53 for providing information as regards to the level of service. The MT 12 generated token 50 includes the P-CSCF IP address 30 and a session identifier (Session ID 51) that identifies the session in which the MT 12 is registered (step 28) and a QoS parameter for identifying the level of service that is to be applied to the packet data sent from the MT 12 to the IMS 102 and vice versa. If the MT 12 provides data in FQDN format in the token 50, the PDF 18 performs a DNS resolution to retrieve the IP address 30 of the P-CSCF 22. When the PDF 18 receives the token 50, it requests QoS information for the session from the P-CSCF 22 by sending the message with the token 50 and provides its own IP address (not shown). The session identifier 51 will be used by the P-CSCF 22 to identify the session for which a registration has been performed at step 28. The P-CSCF 22 may use the PDF IP address (not shown) received with the token 50 for subsequent eventual gate control communication initiated by the PCSCF 22.

Subsequently, a negotiation 54 between the PDSN 16, the PDF 18 and the SIP Proxy 22 is performed. The negotiation 54 is performed in order to provide an IMS network access and an establishment of a Media flow session for the MT 12 in the IMS 102, the PDSN 16 determines that the flow mapping requires authorization and initiates an Authorization Query to the PDF 18 and includes the token 50 provided by the MT 12. The PDF 18 determines that QoS authorization session information should be obtained from the P-CSCF 22 and thus obtains the IP address 30 of the PCSCF 22 from the information forwarded by the PDSN 16 during the negotiation 54. The PDF 18 further sends the token 50 to the P-CSCF 22. If the P-CSCF IP address 30 is a Fully Qualified Domain Name (FQDN) format in order to retrieve the IP address 30 of the P-CSCF 22, the PDF 18 may perform a Domain Name Server (DNS) query. The P-CSCF 22 responds by returning information regarding the authorized QoS for the session associated with the token 50. The P-CSCF 22 also stores the corresponding PDF IP address in case it needs to communicate with the PDF 18 later during the session, such as for example gate control. The P-CSCF 22 may also include in the response, an authorization to open the gate. This flow assumes that such authorization is performed later in the call flow. Based on the local policy at the PDF 18, the PDF 18 translates the authorized application level QoS parameters received from the P-CSCF 22 to the corresponding allowed IP level QoS parameters for use by the PDSN. If the application level QoS requested by the authorizing entity is allowed by local policy, the PDF 18 confirms this back to the PCSCF 22. The PDF 18 then passes these mapped/translated Authorized QoS parameters to the PDSN 16. During the negotiation 54, the PDSN 16 compares the requested QoS parameters received from the MT 12 to the authorized QoS parameters received from the PDF. If the MT 12 requested QoS parameters are within the limits established by the authorized QoS parameters, the PDSN 16 replies with a Reservation Confirmation indication to the MT.

Following the negotiation 54, the PDSN 16 sends a RSVP message to the MT. After bearer resource connection 40 and flow mapping are successfully established, a Media flow session 60 is established between the MT 12 and an endpoint, which is the IMS 102 or ultimately another MT accessed through the IMS 102, if the requested packet data service is to set up a call with the other MT 12. During the Media flow session 60, the MT 12 sends a SIP Update message to the S-CSCF 24 or ultimately to the called MT. Following the reception of the SIP Update message, the S-CSCF 24 sends an acknowledgement message to the MT 12 via the P-CSCF 22. The S-CSCF 24 then sends a SIP ringing message to the MT 12 via the P-CSCF 22. Following this, the MT 12 sends a SIP Prack for acknowledging the reception of the SIP ringing message. The destination point responds with SIP acknowledgement message for the Prack to the MT 12. A final acknowledgement message is sent to the MT 12 to confirm that the session is established. On receipt of the final acknowledgement message, the P-CSCF 24 requests the opening of a gate by sending a directive to Open Gate to the PDF 18. The PDF 18 directs the PDSN 16 to open the gate for the appropriate media streams. The PDSN 16 confirms the open gate to the PDF, which in tam confirms the open gate to the PCSCF 22. The P-CSCF 22 then forwards the final acknowledgement to the originating MT 12. The MT 12 sends an SIP ACK to acknowledge the final acknowledgement message to the destination point (not shown) through the P-CSCF 22 and S-CSCF 24. Media flow is transported between the MT 12 and the destination point through the PDSN 16, which applies flow mapping/treatment for the packet data.

It can be understood that some messages and therefore some parameters sent from the MT 12 to the packet data network 100 and vice versa are not mentioned nor described for clarity reasons. Also some messages and therefore some parameters sent between network elements in the packet data network 100, the PCN 101 and the IMS 102 are omitted for clarity reasons. More particularly, it should also be understood that FIGS. 1A and 1B depict a simplified packet data network 100, and that many other network elements have been omitted for clarity reasons only.

What is claimed is:

1. A method for providing a level of service for a Mobile Terminal (MT) in a packet data telecommunications network comprising a Packet Data Function (PDF), a Packet Core Network (PCN) and an IP Multimedia system (IMS), the IMS further comprising a proxy server, the method comprising the steps of:

receiving at the MT from a proxy server, during a registration of the MT, an IP address of the proxy server;

receiving at the MT from the proxy server, a request for quality of service (QoS) parameters for a session between the MT and the proxy server;

generating a token for correlating accounting information and for informing the proxy server of the QoS parameters to be applied to packet data to be sent during the session, wherein the token includes the proxy server IP address, the QoS parameters, and a session identity parameter;

sending a response message including the token from the MT to the PCN;

forwarding the token from the PCN to the PDF;

receiving the token at the PDF; and correlating at the PDF accounting information between the PCN and the IMS.

2. The method of claim 1 further comprising, prior to the step of receiving the request, a step of setting up a bearer connection between the MT and a Packet Data Service Node (PDSN).

3. The method of claim 1, wherein after the step of generating, the method comprises a step of establishing a media flow session between the MT and the IMS using media streams set up at the MT.

4. A Mobile Terminal (MT) for receiving packet data services in a packet data network, the MT comprising:
   a Service Logic (SL) for:
   receiving from a proxy server, during a registration of the MT, an IP address of the proxy server;
   receiving from the proxy server, a request for quality of service (QoS) parameters for a session between the MT and the proxy server;
     generating a token for correlating accounting information and for informing the proxy server of the QoS parameters to be applied to packet data to be sent during the session, wherein the token includes the proxy server IP address, the QoS parameters, and a session identity parameter; and
   sending a response message including the token to a Packet Core Network (PCN);
   wherein the token is for correlating accounting information between the PCN and an IP Multimedia system (IMS) comprising the proxy server.

5. A packet data telecommunications network comprising:
   an IP Multimedia system (IMS) further comprising a proxy server for sending towards a Mobile Terminal (MT), during a registration of the MT, an IP address of the proxy server and for sending towards the MT a request for quality of service (QoS) parameters for a session between the MT and the proxy server;
   a Packet Core Network (PCN) for receiving, from the MT, a token for use in correlating accounting information and for use in informing the proxy server of the QoS parameters to be applied to packet data to be sent during the session, wherein the token includes the proxy server IP address, the QoS parameters, and a session identity parameter; and
   a Packet Data Function (PDF) for receiving from the PCN the token and for correlating accounting information between the PCN and the IMS.

* * * * *

UNITED STATES PATENT AND TRADEMARK OFFICE
CERTIFICATE OF CORRECTION

PATENT NO. : 7,561,579 B2 Page 1 of 1
APPLICATION NO. : 11/108805
DATED : July 14, 2009
INVENTOR(S) : Madour et al.

It is certified that error appears in the above-identified patent and that said Letters Patent is hereby corrected as shown below:

In Column 2, Lines 48-50, delete "responsive to the reception......................to the proxy server.".

In Column 5, Line 30, delete "PCSCF" and insert -- P-CSCF --, therefor.

In Column 5, Line 40, delete "PCSCF" and insert -- P-CSCF --, therefor.

In Column 5, Line 59, delete "PCSCF" and insert -- P-CSCF --, therefor.

In Column 6, Line 23, delete "tam" and insert -- turn --, therefor.

In Column 6, Line 23, delete "PCSCF" and insert -- P-CSCF --, therefor.

Signed and Sealed this

Twenty-fourth Day of November, 2009

David J. Kappos
*Director of the United States Patent and Trademark Office*